United States Patent [19]
Aycock et al.

[11] Patent Number: 4,588,806
[45] Date of Patent: May 13, 1986

[54] POLYPHENYLENE ETHER RESINS HAVING BIMODAL MOLECULAR WEIGHT DISTRIBUTIONS AND METHOD OF THEIR FORMATION

[75] Inventors: David F. Aycock, Glenmont, N.Y.; Philip L. Kinson, Brecksville, Ohio

[73] Assignee: General Electric Company, Selkirk, N.Y.

[21] Appl. No.: 669,573

[22] Filed: Nov. 8, 1984

[51] Int. Cl.$^4$ ............................................. C08G 65/44
[52] U.S. Cl. ................................. 528/215; 528/212; 525/390
[58] Field of Search ............................... 528/212, 215

[56] References Cited

U.S. PATENT DOCUMENTS

| | | | |
|---|---|---|---|
| 3,432,466 | 3/1969 | Hay | 528/212 |
| 4,092,294 | 5/1978 | Bennett | 528/215 |
| 4,156,772 | 5/1979 | Loucks | 528/212 |
| 4,156,773 | 5/1979 | Loucks | 528/212 |
| 4,340,696 | 7/1982 | White | 528/212 |
| 4,463,164 | 7/1984 | Dalton | 528/212 |
| 4,496,679 | 1/1985 | Hambrecht | 528/212 |

FOREIGN PATENT DOCUMENTS 0076993  4/1983  European Pat. Off. ............ 528/215

OTHER PUBLICATIONS

Journal of Polymer Science: Part A-1, vol. 10, No. 6, pp. 1565–1578; Article by D. M. White et al.

Primary Examiner—C. Warren Ivy
Attorney, Agent, or Firm—Hedman, Gibson, Costigan & Hoare

[57] ABSTRACT

New forms of polyphenylene ether resin have been discovered that are characterized by two distinct molecular weight distributions as determined by gel permeation chromatography. Two maxima are exhibited, one of which corresponds to a polystyrene equivalent molecular weight greater than 30,000, the other of which is less than 30,000. The polymers, which may be termed "bimodal", have improved melt flow in comparison with conventional (unimodal) polyphenylene ether resins.

10 Claims, No Drawings

POLYPHENYLENE ETHER RESINS HAVING BIMODAL MOLECULAR WEIGHT DISTRIBUTIONS AND METHOD OF THEIR FORMATION

BACKGROUND OF THE INVENTION

The polyphenylene ether resins have developed significant use as a family of engineering thermoplastic materials that can be extruded or molded into various plastic articles and component parts. These resins are more typically combined with other polymers and/or various additives to upgrade or achieve a particular desirable combination of properties. Methods of their preparation are described in the patent literature, including U.S. Pat. Nos. 3,306,874; 3,306,875; and 3,914,266(Hay) and U.S. Pat. No. 4,092,294(Bennett,Jr., et al.).

In general, the polyphenylene ether resins are prepared by processes involving the oxidative coupling of one or more phenolic compounds in the presence of a metal-amine complex catalyst, typically a copper-amine. The molecular weight of the polymer is in the usual case controlled by the reaction time, with longer reaction times resulting in a polymer having a greater number of units and longer chain length. It has been a practice to use as a controlling standard the intrinsic viscosity of the final polymer, it being generally desirable to obtain viscosities in the range between 0.4 and 0.6 deciliters per gram as measured in chloroform at 25° C.

Blends of polyphenylene ether resin with polystyrene produce molded articles with excellent tensile, impact and thermal properties. The addition of the polystyrene to polyphenylene ether resins increases the melt flow of the polyphenylene ether which, in turn, improves the processing of these blends into injection molded articles. However, in many cases further improvement in the melt flow is desirable.

It has been speculated that the melt flow of polyphenylene ether-polystyrene blends should be upgraded by using a polyphenylene ether having a broader molecular weight distribution. It is theorized that the fraction of polyphenylene ether having a lower molecular weight will increase the melt flow, while the higher molecular weight fraction will serve to maintain the tensile, impact and heat distortion temperature properties of the blends.

SUMMARY OF THE INVENTION

The discovery has now been made of new forms of polyphenylene ether resin, which are prepared by the oxidative coupling of a phenolic starting material in the presence of a copper-amine complex catalyst, the reaction also being conducted in the presence of greater amounts of one or more diphenoquinone compounds than is conventional for such polymerization reactions. The resulting polymer can be termed a "bimodal" polyphenylene ether resin, in that it is characterized by the presence of two distinct molecular weight distributions. More specifically, the polymer shows the presence of two distinct maxima or peaks in the gel permeation chromatograph, in which the maximum of the lower molecular weight peak is less than 30,000 and the maximum of the higher molecular weight peak is greater than 30,000.

Suprisingly, the polymers and blends of such polymers are comparable to those of the aforementioned broad molecular weight distribution, exhibiting better melt flow in comparison to conventional polyphenylene ether resins while retaining good tensile, impact and heat distortion properties.

The bimodal polyphenylene ether resins of this invention are prepared by building a high molecular weight polyphenylene ether resin reaction mixture containing relatively large amounts of diphenoquinone(s), that is, at least 1% by weight based on the weight of unreacted monomer. The mixture is then reacted in the presence of a chelating agent, for example, nitrilo triacetic acid, or the like, until a polymer having the described bimodal characteristics is obtained. Temperatures of at least 30° C., and especially from 30° to 110° C., and time periods of 30 to 180 minutes are useful and preferred.

As is known from rhe previous work and teachings of Hay, the polyphenylene ether-forming reaction itself normally results in the formation of small amounts of diphenoquinones as by-products. The present process differs from such conventional procedures in that the reaction conditions are selected to favor the production of significantly larger amounts of diphenoquinones during the course of the reaction, without detracting from the polymer yield, such that the polymer has the described bimodal characteristics. A convenient way of increasing the amount of diphenoquinone above the normal amount produced in the reacrion is to add most or all of the monomer or monomers at the start of the reaction. Higher levels of monomer increase the amount of diphenoquinone produced.

The normal, conventional procedure involves adding only a portion of the monomer to the start, and introducing the remainder more gradually after the reaction has begun. This is in accordance with the objective to minimize the amount of diphenoquinone produced, because, as is known, as the amount of diphenoquinone goes up the polymer normally undergoes a larger drop in intrinsic viscosity after the addition of oxygen has stopped. In such cases, the diphenoquinone appears to act as a chain-cleaving agent, reducing the chain length and molecular weight of the polymer. Since it has heretofore been a goal to achieve a polymer of about 0.4 to 0.6 deciliters per gram, as measured in solution in chloroform at 25° C., it was considered necessary to prevent the formation of too large a concentration of diphenoquinone by-product, otherwise the end polymer would have too low an I.V. and some of the desirable properties might suffer. The present invention marks a departure from that procedure. An unforeseen development associated with the new procedure, and the new polymer which results, is that the initial production of higher I.V. polymer in the presence of higher levels of diphenoquinone by-product results in an I.V. drop to the desired range of 0.4 to 0.6 deciliters per gram but also unexpectedly produces a polymer with two distinct molecular weight distributions. Apparently, the diphenoquinone selectively cleaves a certain population of polymer chains, dropping their molecular weight, and leaves undisturbed another population of polymer chains.

DESCRIPTION OF THE INVENTION

The diphenoquinones employed in the present polyphenylene ether resin forming reaction are those of the formula

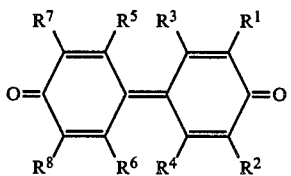

in which each R is independently selected from the group consisting of lower alkyl having from 1 to 6 carbon atoms, and hydrogen.

Most preferred are those compounds of the above formula in which $R^1$, $R^2$, $R^7$ and $R^8$ are each substituted with alkyl, and especially methyl, i.e., tetramethyl diphenoquinone.

In general, the process of this invention is carried out by passing an oxygen-containing gas through a solution of one or more monohydric, 2,6-disubstituted, monocyclic phenols as a starting material in a solvent which also contains, as a catalyst, an amount of a dissolved complex comprising at least one copper salt and at least one amine, which may be a primary or secondary amine. The reaction medium will also contain an effective amount of one or more of the described diphenoquinones.

The phenols employed as the starting material are represented by the following formula:

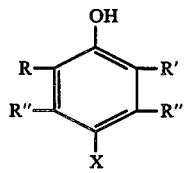

in which X is a substituent selected from the group consisting of hydrogen, chlorine, bromine and iodine, R is a monovalent substituent selected from the group consisting of hydrocarbon radicals, hydrocarbonoxy radicals, haloaryl radicals, and haloaryloxy radicals, R' is the same as R and, in addition, halogen, that is, fluorine, bromine, chlorine or iodine, and R" is the same as R and, in addition, hydrogen and halogen, but preferably hydrogen.

Typical phenols which fall within the scope of this formula are 2,6-dimethylphenol, 2,6-diethylphenol, 2,6-dibutylphenol, 2,6-dilaurylphenol, 2,6-dipropylphenol, 2,6-diphenylphenol, 2-methyl-6-ethylphenol, -methyl-6-propargylphenol, 2-methyl-6-cyclohexylphenol, -methyl-6-benzylphenol, 2-methyl-6-tolylphenol, -methyl-6-methoxyphenol, 2-ethyl-6-phenylethylphenol, 2,6-dimethoxyphenol, 2,3,6-trimethylphenol, 2,3,5,6-tetramethylphenol, 2,6-diethoxyphenol, -methoxy-6-ethoxyphenol, 2-ethyl-6-stearyloxyphenol, 2,6-di(-chlorophenoxy) phenol, 2,6-dimethyl-3-chlorophenol, -methyl-6-bromophenol, 2-methyl-4-chloro-6-bromophenol, 2,3,5-trimethyl-6-chlorophenol, 2,6-dimethyl-4-chlorophenol, 2,6-dimethyl-3-chloro-5-bromophenol, 2,6-di-(chloroethyl) phenol, 2-methyl-6-isobutylphenol, -methyl-6-phenylphenol, 2,6-dibenzylphenol, 2,6-ditolylphenol, 2,6-di(chloropropyl)phenol, 2,6-di-(2'-,4'-dichlorophenyl)-3-allylphenol, and the like.

In providing the catalyst, either a cupric salt or cuprous salt or mixture of both may be used, the only provision being that the salt be capable of forming a complex with the amine that is soluble in the reaction medium.

Examples of the copper salts suitable for this process include cuprous chloride, cupric chloride, cuprous bromide, cupric bromide, cuprous sulfate, cupric sulfate, cuprous azide, cupric azide, cuprous tetraamine sulfate, cupric tetraamine sulfate, cuprous acetate, cupric acetate, cuprous propionate, cupric butyrate, cuprous palmitate, cupric laurate, cuprous benzoate, cupric toluate, and the like.

Suitable primary and secondary amines are those which are free of aryl substituents directly bonded to the amine nitrogen, that is, the amine nitrogen is directly bonded to an aliphatic carbon atom. Examples of such amines include aliphatic amines, including cycloaliphatic amines wherein the cycloaliphatic group is substituted on the amine nitrogen, such as mono- and dimethylamine, mono- and diethylamine, mono- and dipropylamine, mono- and dibutylamine, mono- and disecondary propylamine, mono- and dibenzylamine, mono- and dicyclohexylamine, mono- and diethanolamine, ethylmethylamine, methylpropylamine, allylethylamine, methylcyclohexylamine, morpholine, methyl n-butylamine, ethylisopropylamine, benzylmethylamine, octylchlorobenzylamine, methylphenethylamine, benzylethylamine, di(chlorophenethyl)-amine, 1-methylamino-2-phenylpropane, 1-methylamine-4-pentene, and so forth.

It is to be expected that primary, secondary, mixed primary-secondary, mixed primary-tertiary, or mixed secondary-tertiary polyfunctional amines will behave in the same way as primary and secondary monoamines in the oxidative coupling reaction, with the particular amount being dependent upon the equivalent amount of amino groups. Examples of polyfunctional amines which are useful in the practice of this invention are aliphatic polyamines such as N,N'-dialkylethylenediamines, N,N,N' trialkylethylene-diamine, propanediamine, ethylenediamine, N-alkylethylenediamines, N-alkylpropane diamines, N,N'-dialkylpropanediamines, N,N,N'-trialkylpropanediamines, N,N'-dialkylbutanediamines, pentanediamine, N-alkylpentanediamines, N,N'-dialkylpentanediamines, N,N,N'-trialkylpentanediamines, diethylenetriamine, N-alkyldiethylenetriamines, N,N'-dialkyldiethylenetriamines, N,N',N''-trialkyldiethylenetriamines, N,N,N'-trialkyldiethylenetriamines, N,N',N',N''-tetraalkyldiethylenetriamines, N',N',N'',N''-tetraalkyldiethylenetriamines, cyclohexyldiamines, and the like. Mixed aliphatic and cyclic amines, for example, aminoalkylpyridenes, alkylaminoalkylpyridines, and so forth, may be employed.

Examples of cyclic amines which are suitable for use in this invention are pyrrole, pyrrolidine, piperidine, imidazole, tetrahydroquinoline, tetrahydroisoquinoline, and morpholine.

As taught in the above-mentioned Hay patents, the copper-amine complex may be formed by adding cupric hydroxide to a cupric salt, adding a base to a cupric salt, adding an alkaline salt of a phenol to a cupric salt, or by treating a cupric salt with an ion-exchange resin having exchangeable hydroxyl groups. Preferably, these reactions are carried out in the presence of the primary or secondary amine to prevent precipitation of the basic cupric salt, but addition of the amine later to dissolve the basic cupric salt is also permissible.

Other ways of forming the copper-amine complex are also possible and many are known to those skilled in the art. For instance, cuprous salts or mixtures of cuprous and cupric salts may be used as a starting component for the catalyst formation.

Favored for use as the catalyst are copper-amine complex systems based on a diamine and a tertiary amine in combination, as disclosed in U.S. Pat. No. 3,914,266(Hay), and especially a diamine, a tertiary amine and a secondary monoamine in combination, as disclosed in U.S. Pat. No. 4,092,294(Bennett, Jr., et The useful diamines include those of the formula

  (III)

in which each $R^9$ is independently isopropyl, a $C_{4-8}$ tertiary alkyl or a cycloalkyl group having no hydrogens on the alpha-carbon atom. $R^{10}$ has at least two and no more than three carbon atoms separating the two nitrogen atoms and is $C_{2-4}$ alkylene or $C_{3-7}$ alkylene. Examples of such compounds are: N,N'-di-tert-butylethylenediamine; N,N'-di-tert-amylethylenediamine; and N,N'-diisopropylethylenediamine.

The tertiary amine is preferably one which has low steric requirements, such as tri-lower alkyl amines in which the alkyl groups contain from 1 to 6 carbon atoms, for example, trimethylamine, n-butyldimethylamine, or N-methyl pyrrolidine.

The secondary monoamines are preferably those of the formula

  (IV)

in which $R^{11}$ and $R^{12}$ are independently selected from group consisting of lower alkyl having from 1 to 12 carbon atoms, and preferably lower alkyl having from 3 to 6 carbon atoms. Suitable lower alkyl substituents include methyl, ethyl, n-propyl, isopropyl, n-butyl, n-hexyl, n-octyl, n-decyl, and the like.

Besides the above mentioned copper-amine complex, it is often also advantageous to include in the reaction medium an amount of a bromine containing compound, such as hydrogen bromide, an alkali metal bromide, an alkaline earth metal bromide or 4-bromophenol. Experience has shown that the presence of bromide ions in the reaction medium usually enhances the effect of the catalyst and further promotes the oxidative coupling reaction and formation of the polyphenylene ether.

In the preferred embodiments, molar ratios of individual amines to copper will be as follows: 0.5 to 4 moles of diamine per g/atom of copper; 20 to 80 moles of tertiary amine per g/atom of copper; and 1 to 12 moles of secondary monoamine per g/atom of copper. The molar ratio of 2,6-di-substituted phenol to copper is from 300:1 to 1500:1.

The reaction may be used to produce polyphenylene ether homopolymers and copolymers having units of the formula

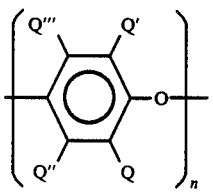  (V)

in which Q, Q', Q" and Q''' are independently selected from the group consisting of hydrogen, halogen, hydrocarbon radicals, halohydrocarbon radicals, hydrocarbonoxy radicals and halohydrocarbonoxy radicals; and n represents the total number of monomer units and is an integer of at least about 20, and more usually of at least 50.

Some of the polymers which can be produced and which are within the above formula are poly(2,6-dilauryl-1,4-phenylene) ether; poly(2,6-diphenyl-1,4-phenylene) ether; poly(2,6-dimethoxy-1,4-phenylene) ether; poly(2,6-diethoxy-1,4-phenylene) ether; poly(2-methoxy-6-ethoxy-1,4-phenylene) ether; poly(2-ethyl-6-stearyloxy-1,4-phenylene) ether; poly(2,6-dichloro-1,4-phenylene) ether; poly(2-methyl-6-phenyl-1,4-phenylene) ether; poly(2,6-dibenzyl-1,4-phenylene) ether; poly(2-ethoxy-1,4-phenylene) ether; poly(2-chloro-1,4-phenylene) ether; and poly(2,6-dibromo-1,4-phenylene) ether.

Also included within the above formula are copolymers, especially those based on the reaction of 2,6-dimethyl phenol in admixture with another phenol such as 2,3,6-trimethylphenol or 2-methyl-6-butylphenol to produce, for example, poly(2,6-dimethyl-co-2,3,6-trimethylphenol-1,4-phenylene) ether or poly(2,6-dimethyl-co-2-methyl-6-butylphenol-1,4-phenylene), ether, respectively.

Especially preferred end products are homopolymers having alkyl substituents in the two positions ortho to the oxygen ether atom, that is, those polymers of the above formula in which Q and Q' are alkyl, particularly alkyl having from 1 to 4 carbon atoms. Most preferred is poly(2,6-dimethyl-1,4-phenylene) ether, particularly one having an intrinsic viscosity from about 0.4 to about 0.6 deciliters per gram measured in solution in chloroform at 25° C.

Solvents for the reaction may be selected from among a wide range of materials, including alcohols, ketones, hydrocarbons, chlorohydrocarbons, nitrohydrocarbons, ethers, esters, amides, mixed ether-esters, and sulfoxides. Toluene is preferred.

By way of illustrating the practice of this invention, the copper-amine complex is dissolved in the reaction solvent, the phenolic starting material is then added, and oxygen or an oxygen-containing gas is bubbled through the reaction mixture, causing an exothermic reaction to take place with the formation of water and diphenoquinone as by-products. If a solvent is used which is immiscible with water, it is desirable to remove the water as is is formed to facilitate the reaction and prevent the formation of a separate, aqueous phase which tends to inactivate the catalyst.

The passage of oxygen into the reaction mixture is continued until no more heat is generated or the desired amount of oxygen is absorbed. In general, the molecular weight of the polyphenylene ether end product will be controlled by the reaction time, longer times providing a higher average number of repeating units.

A preferred way of practicing this invention is to add a strong copper chelating agent (for example, nitrilo triacetic acid or ethylene diamine tetraacetic acid) to the reaction mixture after stoppage of the oxygen addition, but before the diphenoquinone has reacted to any appreciable extent with the polyphenylene ether. The reaction of the mixture with the chelating agent present favors the formation of a bimodal polymer.

After the reaction has been completed, the polymer is recovered from the reaction mixture, redissolved any desirable number of times, reprecipitated to remove impurities, then filtered, washed and dried.

When dry, the polymer product can be fabricated into useful and well known products by molding, extrusion, calendering, and other conventional techniques. The polymer is utilizable as such or in admixture with other polymers known to those skilled in the art, for example, polystyrenes, polyolefins, polycarbonates, polyesters, polyamides, and so forth. The polyphenylene ether resin and resin blends may also be modified with additives such as flame retardant agents, smoke suppressants, plasticizers, impact modifiers, antioxidants, coloring agents, stabilizers, processing aids, and so forth, as also known to those skilled in the art.

The polyphenylene ether resin may also be used in admixture with other thermoplastic polymers, including polycarbonates, polyesters, poly(alkenyl aromatics), polyvinyl chlorides, polyacrylates, polyamides and polyolefins.

The invention is illustrated further in the following examples, which are not intended to be limiting.

EXAMPLES

A poly(2,6-dimethyl-1,4-phenylene)ether resin in accordance with this invention, having a bimodal molecular weight distribution, was prepared as follows:

In a reactor (10 gallon capacity) equipped with internal cooling means and an oxygen dip tube were added the following materials in the order listed:
(1) 5.9 gallons of toluene containing 0.9% by weight of n-butyldimethylamine
(2) 30.4 pounds of a 40% by weight solution of 2,6-xylenol in toluene
(3) 78 grams of dibutylamine
(4) 248 grams of additional of n-butyldimethylamine
(5) 25 grams of N,N'-di-tert-butylethylenediamine
(6) 5.4 grams of cuprous oxide dissolved in grams of 48% hydrobromic acid Oxygen was added continuously to the reaction mixture, with stirring, at a rate of 20 standard cubic feed per hour while maintaining the temperature at 38 to 40° C. The addition was continued for a period of 60 minutes. The temperature was then raised to 49° C., the oxygen flow was continued for an additional 60 minutes, then it was terminated. The intrinsic viscosity of the polymer at this point was 0.84 deciliter per gram as measured in solution in chloroform at 25° C. The gel permeation chromatograph (GPC) of this polymer was similar to that of a conventional poly(2,6-dimethyl-1,4-phenylene) ether resin, which contains only one peak in the chromatograph.

The reaction mixture was kept under a nitrogen blanket. The mixture was treated by adding 58 grams of nitrilotriacetic acid chelating agent, then reacted by heating at 66 to 71° C. for 3 hours and 20 minutes.

The mixture was centrifuged to remove the catalyst residue, methanol was added as an antisolvent to precipitate the polymer, and the polymer was recovered and dried. It was characterized by exhibiting two distinct peaks on a gel permeation chromatograph, as reported in Table 1.

For purposes of comparison, a control experiment was used to produce a poly(2,6-dimethyl-1,4-phenylene)ether resin in accordance with the conventional manner, as follows:

The procedure described above was repeated, except modified to add 10% of the total monomer (2,6-xylenol) charge to the reaction initially, then pumping the remainder into the reactor at a linear rate over a 40 minute period. The ratio of catalyst components was as follows:

| | |
|---|---|
| cuprous oxide | 1 mole |
| n-butyldimethylamine | 31 moles |
| dibutylamine | 7.2 moles |
| N,N'-di-tert-butylethylenediamine | 1.6 moles |
| hydrobromic acid | 4.3 moles |
| 2,6-xylenol | 750 moles |

Again, oxygen was added continuously, and at the point where the addition was stopped the polymer had an intrinsic viscosity of 0.6 deciliter per gram (chloroform, 25° C.). The intrinsic viscosity of the final polymer, produced after the entire procedure was completed, was 0.48 dl/g. Only one peak was exhibited in the gel permeation chromatograph, reported in Table 1.

Gel permeation chromatograph (GPC) measurements were performed using a Waters' Associates Model 150C instrument with five u-Styragel elution columns ($10^5, 10^4, 10^3, 10^2$ and 500 Angstroms). Solutions of 0.1% by weight of poly(2,6-dimethyl-1,4-phenylene) ether resin in chloroform were injected into the instrument, using tetrahydrofuran as the eluent. The molecular weight data is reported as polystyrene equivalent molecular weights, as determined with reference to a calibration curve of elution time versus molecular weight based upon monodisperse polystyrene standards. The maxima of the curve are defined in the conventional sense as being the point where the slope of the curve is zero and the adjacent points are lower valued.

A useful reference book is "Modern Size Exclusion Chromatography", W. W. Yau and J. J. Kirkland, Wiley-Interscience, New York, 1979.

The properties of the two polymers were evaluated for the powdered forms, in the form of pressed polymer films, and as extruded polymer blends. The films were prepared by pressing two grams of the polymer for two minutes at 1000 psi between platens heated to 280° C. The extruded blends were prepared by mixing 57 parts by weight of poly(2,6-dimethyl-1,4-phenylene) ether resin, 43 parts by weight of high impact, rubber modified polystyrene, 4.5 parts by weight of isopropylated triphenyl phosphate, 1.5 parts by weight of polyethylene, 1.0 part by weight of tridecylphosphite, 0.15 part by weight of zinc sulfide and 0.15.part by weight of zinc oxide. The results are reported in Table 2.

TABLE 1

ANALYSES OF THE POLYMERS

| Properties | A (This invention; Bimodal) | B (Control) |
|---|---|---|
| Intrinsic Viscosity, dl/g (CHCl$_3$,25° C.) | 0.43 | 0.48 |
| % N | 0.13 | 0.13 |
| % H | 0.15 | 0.05 |
| Cu (ppm) | 33 | 5 |
| Molecular Weight (weight average) | 4,600 / 91,100 | 32,400 |
| Peak Molecular Weight(s) (Polymer) | 14,500 / 58,742 | 35,300 |
| Peak Mol. | 18,200 | 54,700 |

TABLE 1-continued

ANALYSES OF THE POLYMERS

| Properties | A (This invention; Bimodal) | B (Control) |
|---|---|---|
| Wt. (Pressed film) | 63,100 | |
| Peak Mol. Wt.(Extruded Polymer Blend) | 18,200 / 72,800 | 58,700 |

TABLE 2

PHYSICAL PROPERTIES OF BLENDS PREPARED FROM THE POLYMERS*

| Properties | A (This Invention, Bimodal) | B Control |
|---|---|---|
| Flow channel length, inches | 23.9 | 16.9 |
| Heat distortion temp., °F. | 237 | 244 |
| Izod impact strength, ft.lb./in. | 1.6 | 3.6 |
| Gardner impact strength, in. lb. | 50 | 100 |
| % Elongation | 41 | 58 |
| Tensile yield, psi | 9280 | 9760 |
| Ultimate tensile strength, psi | 8100 | 8480 |
| Yellowness index | 28.9 | 26.8 |

*Prepared as described above

As can be seen from Table 1, the polymer according to the invention exhibits two maxima, indicative of two distinct molecular weight distributions one of which is above 30,000 and the other of which is below 30,000 (again, these are polystyrene equivalent molecular weights, not absolute). The control polymer, on the other hand, shows only one maximum.

As can be seen from the properties in Table 2, the bimodal polyphenylene ether blend in accordance with this invention has similar tensile, impact and heat distortion properties in comparison with the control, but the flow channel length, a measure of the ease of melt flow, is 41% greater.

All of the patents and publications mentioned above are incorporated herein by reference.

Other modifications and variations of this invention are possible and will occur to those skilled in the art in the light of the above disclosure. It should be understood, therefore, that changes may be made in the particular embodiments shown without departing from the scope of the invention defined in the appended claims.

We claim:

1. A process for forming a polyphenylene ether resin which is characterized by having at least two distinct molecular weight distributions as determined by gel permeation chromatography, the gel permeation chromatography showing at least two peaks, one of which has a maximum value greater than 30,000 and the other of which has a maximum value of less than 30,000, said number values representing standard polystyrene equivalent molecular weights, comprising:
    (a) providing a solution of one or more reactive phenolic compounds and a copper-amine complex polymerization catalyst in a solvent;
    (b) contacting the solution with oxygen or an oxygen-containing gas at a temperature not less than 30° C., without adding any more of the phenolic compounds, to cause a polymerization reaction and to form a mixture of a polyphenylene ether resin, by-product water and by-product diphenoquinone, said diphenoquinone being in an amount not less than one percent by weight, based on the weight of unreacted phenolic compounds;
    (c) reacting the mixture from step (b), at a temperature not less than 30° C., in the presence of a chelating agent for the copper-amine catalyst and not less than one percent by weight of said by-product diphenoquinone, based on the weight of unreacted phenolic compounds, until the polyphenylene ether resin which is characterized by two distinct molecular weight distributions has been formed; and
    (d) recovering the polyphenylene ether resin formed in step (c).

2. A process according to claim 1, in which the reaction temperature is from 30° C. to about 110° C.

3. A process according to claim 1, in which the phenolic compound or compounds is of the formula

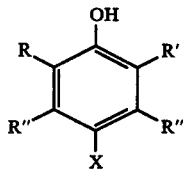

in which X is a substituent selected from the group consisting of hydrogen, chlorine, bromine and iodine, R is a monovalent substituent selected from the group consisting of hydrocarbon radicals, hydrocarbonoxy radicals, haloaryl radicals, and haloaryloxy radicals, R' is the same as R and, in addition, halogen, and R" is the same as R and, in addition, hydrogen and halogen.

4. A process according to claim 3, in which the phenolic compound comprises 2,6-xylenol.

5. A process according to claim 1, in which the copper-amine catalyst both a diamine and a tertiary amine.

6. A process according to claim 1, in which the copper-amine catalyst comprises a diamine, a tertiary amine and a secondary monoamine.

7. A process according to claim 6, in which the diamine is N,N'-di-tert-butylethylenediamine, the tertiary amine is n-butyldimethylamine, and the secondary monoamine is dibutylamine.

8. A process according to claim 1, in which the polyphenylene ether resin is poly (2,6-dimethyl-1,4-phenylene)ether resin.

9. A process according to claim 8, in which the diphenoquinone is tetramethyl diphenoquinone.

10. A process according to claim 1, in which the chelating agent is nitrilotriacetic acid.

* * * * *